June 6, 1944.  G. KIRCHNER  2,350,770
PROCESS OF PRODUCING ARTICLES BY AN INJECTION MOLDING MACHINE
Filed June 5, 1940
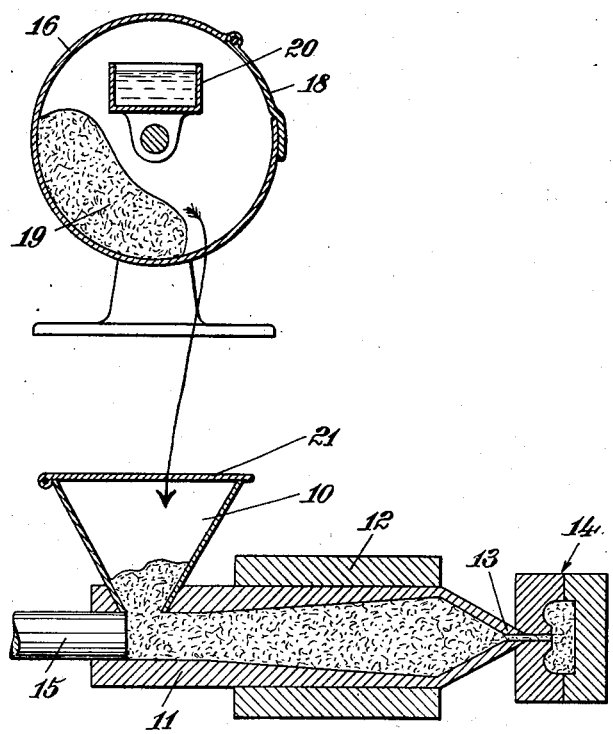
Inventor
GERHARD KIRCHNER
By
Attorney Patented June 6, 1944

2,350,770

UNITED STATES PATENT OFFICE 2,350,770

PROCESS OF PRODUCING ARTICLES BY AN INJECTION MOLDING MACHINE

Gerhard Kirchner, Roda, near Ilmenau, Thuringia, Germany; vested in the Alien Property Custodian Application June 5, 1940, Serial No. 338,886
In Germany April 14, 1939

3 Claims. (Cl. 18—55)

My invention relates to a process of producing articles by an injection molding machine from a cellulose ester material, more particularly from Celluloid.

In a machine of this type the material is fed in comminuted condition into a cylinder and is heated therein to a temperature rendering it plastic, whereupon the material is injected by a plunger through a nozzle into a mold. In the mold, the material cools and solidifies immediately and is then ejected therefrom. The material operated upon in this manner must be capable of being heated to a temperature surpassing the solidifying point sufficiently to enable it to completely fill the cold mold before solidifying therein. For this reason, it has been common practice prior to my invention to raise the temperature of the heating cylinder through which the material is fed, to a temperature of at least 300° centigrade.

These conditions of operation have precluded the possibility of working Celluloid in injection molding machines, as this material, when heated to a temperature in excess of about 200° centigrade and subjected to pressure, is liable to explode. It is highly desirable, however, to use Celluloid in injection molding machines as this material is available on the market at a low price and has very favorable properties, such as high elasticity and strength, a high electrical conductivity and insolubility in gasoline and benzol.

A chemically related material, to wit cellulose acetate, has been successfully molded in injection molding machines as this material is capable of resisting much higher temperatures. In order to render it sufficiently plastic, a pulverized plastifier is added thereto.

Attempts, however, of making use of such plastifiers for molding Celluloid in an injection machine have not been successful. Experience has shown that added plastifiers either adversely affect the properties of the molded articles rendering the same turbid and soft or, if added in a smaller proportion, are incapable of increasing the plasticity of the Celluloid within the permissible temperature limits sufficiently to enable the material to completely fill the mold.

I have found that cellulose esters, particularly Celluloid, can be successfully operated upon in an injection molding machine, if the material is subjected to a preparatory treatment by bringing the material into an atmosphere containing a volatile solvent. In this atmosphere the material is kept sufficiently long to soften it but is removed therefrom, before it assumes a sticky consistency, and is then fed into the injection molding machine. If the raw material is in granulated condition, the preparatory treatment by vapors of acetone, alcohol, amyl acetate or the like will take about ten minutes. Preferably, the material is brought into a closed space containing the solvent but is kept out of contact therewith. The heating cylinder of the injection molding machine is heated to so low a temperature as to preclude any risk of explosion heating the Celluloid to a temperature ranging from 90° to 150° centigrade, preferably to a limit in the neighbourhood of 120° centigrade. The articles so produced are fully homogeneous and satisfactory in every respect.

While my invention offers the greatest advantages when applied to Celluloid, it is applicable to other thermoplastic cellulose esters, such as cellulose acetate or to a material marketed under the trade name "Astralon."

When applied to such materials it offers the advantage that pulverized plastifying agents need not be added and that, therefore, the material need not be pulverized for the purpose of such addition. Also, it permits the production of transparent articles which cannot be produced, when a pulverized plastifying agent is added.

I may add suitable filling materials such as wood pulp, fibrous materials or the like to the raw material, particularly to Celluloid, and in this event subject these filling materials to the same preparatory treatment. This may be done by pulverizing the raw material by admixing the filling material and by subjecting the mixture so obtained to the preparatory treatment with vapors of solvents. I have found that the proportion of the filling material may be raised up to 50% of the mixture without adversely affecting the properties of the articles so produced.

The duration of the preparatory treatment must be so limited that the material will not swell and will not become sticky. Otherwise, the articles produced therefrom would remain soft and sticky and would be difficult to remove from the mold.

An example of my improved process will now be described by reference to the accompanying drawing in which an injection molding machine and means for the performance of the preparatory treatment are illustrated.

Waste Celluloid in form of chips and sheets is so comminuted that the largest particles may freely pass through the lower mouth of the hopper 10 of the injection molding machine. This machine comprises a cylinder 11 into which the thermoplastic material may be fed through the hopper 10. The cylinder is provided with a heating jacket 12, whereby the material fed into the cylinder is heated to plastic condition, and terminates in a nozzle 13, which may be pressed against the mouth of a mold 14. The material fed into the cylinder 11 is injected in plastic condition into the mold through the nozzle 13 by the piston 15. After the material injected into the mold has solidified, the mold is opened and the finished article is ejected therefrom. At the same time, the piston 15 is withdrawn and new material fed into the cylinder through the hopper 10 for the subsequent cycle of operation. As machines of this kind are well known in the art, a detailed description thereof may be dispensed with.

Numerous attempts have been made prior to my invention to work on Celluloid in machines of this kind, as this material has numerous valuable properties and is available on the market at a low price. These attempts have not met with success, however, as Celluloid must not be heated beyond a temperature of about 200° C. and, at this temperature, is not sufficiently plastic to completely fill the mold, since it solidifies therein prematurely. I have found that the preparatory treatment described hereinabove fully remedies this condition.

I may carry out this treatment by means of a rotary drum 16 mounted on a horizontal stationary axle. The drum which is provided with an opening and may be sealed by a cover plate 18, is charged with a suitable quantity 19, e. g. 60 pounds, of the comminuted Celluloid. An open container 20 mounted on the stationary shaft 17 within the drum is filled with a suitable solvent, for instance, with one quart of acetone or alcohol. Then, the drum is sealed and is rotated for about twenty minutes. This process is carried out at normal temperature. Then, the cover 18 is opened and the material is discharged into the hopper 10 which is then closed by a cover plate 21.

The period of time over which the preparatory treatment of the material 19 should be extended varies with the nature of the material and of the solvent and may be readily determined by experiments. It must be so chosen as to reduce the softening temperature of the material sufficiently to secure a complete filling of the mold 14 without, however, rendering the material so soft that the articles will remain sticky. Care must be taken to prevent the material from coming into contact with the liquid solvent. As stated hereinabove, the material 19 may contain a suitable proportion of filling materials unless it is desired to produce transparent articles.

I wish it to be understood that my invention is in no way limited to the specific embodiment described hereinabove with reference to the illustration but is capable of numerous modifications within the scope of the appended claims.

What I claim is:

1. In a process of producing injection-molded articles from waste Celluloid material, the step of tumbling the comminuted material in an atmosphere charged with vapors of a low-boiling solvent prior to transferring the mass to a compression chamber and heating the softened material to substantially 120° Centigrade, and injecting it under pressure into a mold.

2. In a process of the character described wherein pulverized Celluloid is admixed with a filling material, the step of tumbling the pulverized mixture in an atmosphere charged with vapors of a low-boiling solvent prior to transferring the mixture to a compression chamber and heating the mixture and injecting it into a mold by pressure.

3. In a process for producing injection-molded articles of Celluloid material with the aid of heat and pressure while eliminating the danger of explosion, the steps of subjecting comminuted Celluloid material uniformly throughout to the vapor of a volatile liquid organic solvent having an at least softening action on Celluloid, while keeping the material out of contact with the liquid solvent itself, removing the material from the action of the vapors before it has become sticky, and feeding the softened material into an injection molding machine.

GERHARD KIRCHNER.